United States Patent [19]

Schonberger

[11] Patent Number: 4,531,842

[45] Date of Patent: Jul. 30, 1985

[54] DISPOSABLE THERMOMETER PROBE AND RATING TECHNIQUE THEREFOR

[76] Inventor: Milton Schonberger, One Century Tower, Ft. Lee, N.J. 07024

[21] Appl. No.: 547,246

[22] Filed: Oct. 31, 1983

[51] Int. Cl.³ .................... G01K 15/00; G01K 7/16
[52] U.S. Cl. .................................. 374/1; 29/612;
324/74; 324/115; 338/28; 338/229; 364/557;
364/571; 374/3; 374/158; 374/163; 374/171
[58] Field of Search ............... 374/1, 3, 158, 163,
374/170, 171, 209; 338/28, 30, 229; 29/593,
612; 324/63, 74, 115; 364/557, 571

[56] References Cited

U.S. PATENT DOCUMENTS

| | | | |
|---|---|---|---|
| 3,733,862 | 5/1973 | Killmeyer | 250/556 |
| 4,022,063 | 5/1977 | West et al. | 364/557 |
| 4,161,880 | 7/1979 | Prosky | 374/158 |
| 4,179,745 | 12/1979 | Wuertele | 374/171 |
| 4,418,392 | 11/1983 | Hata | 364/557 |

FOREIGN PATENT DOCUMENTS 3030990 4/1981 Fed. Rep. of Germany ...... 374/171

*Primary Examiner*—Charles Frankfort
*Assistant Examiner*—W. Morris Worth
*Attorney, Agent, or Firm*—Ostrolenk, Faber, Gerb & Soffen

[57] ABSTRACT

A method and an apparatus for rating a thermometer probe, wherein the thermometer probe includes a small thermistor sensing element and a pair of conductors connected with the thermistor contacts and being supported upon a substrate. With the thermistor held at a particular temperature, the electrical resistance of the thermometer probe is measured and the difference between the resistance of that probe and a standard resistance is fed to a computer which operates a laser to encode a machine-readable character on the probe representative of the difference between the measured resistance of the probe and the standard resistance. In use, the probe is inserted in a readout and the readout senses the actual resistance of the thermometer probe which is dependent upon the temperature of the thermistor. An optical reader reads the encoded character on the probe and adjusts the actual sensed resistance for the deviation of the resistance of that probe from the standard resistance, whereby the readout accurately indicates temperature sensed by each thermistor probe.

20 Claims, 7 Drawing Figures

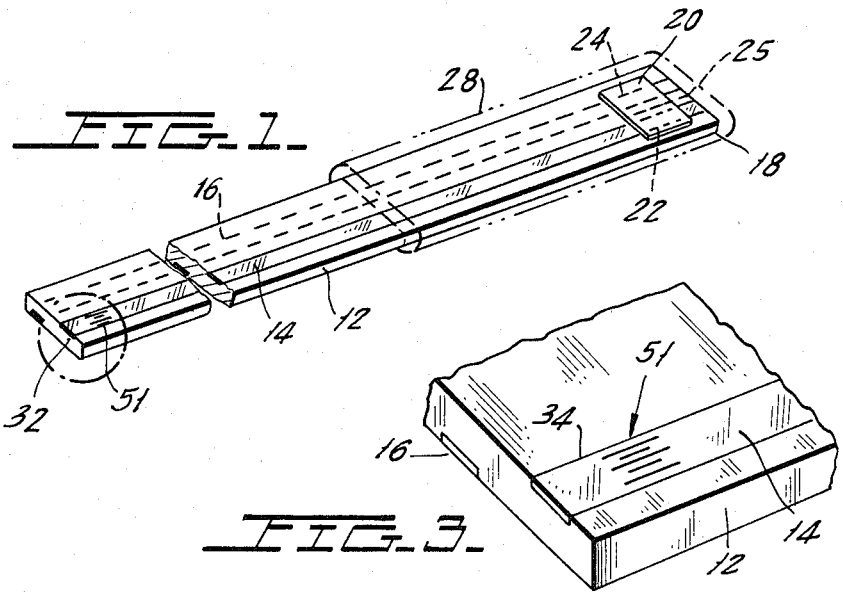
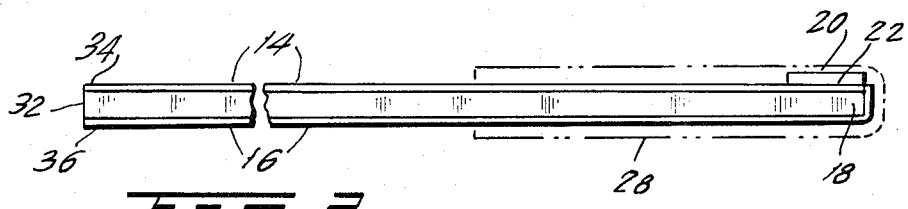
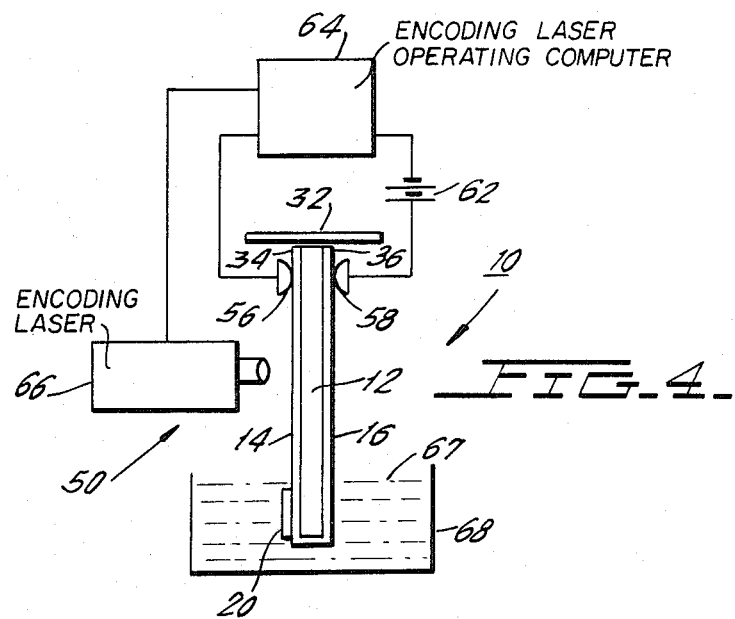

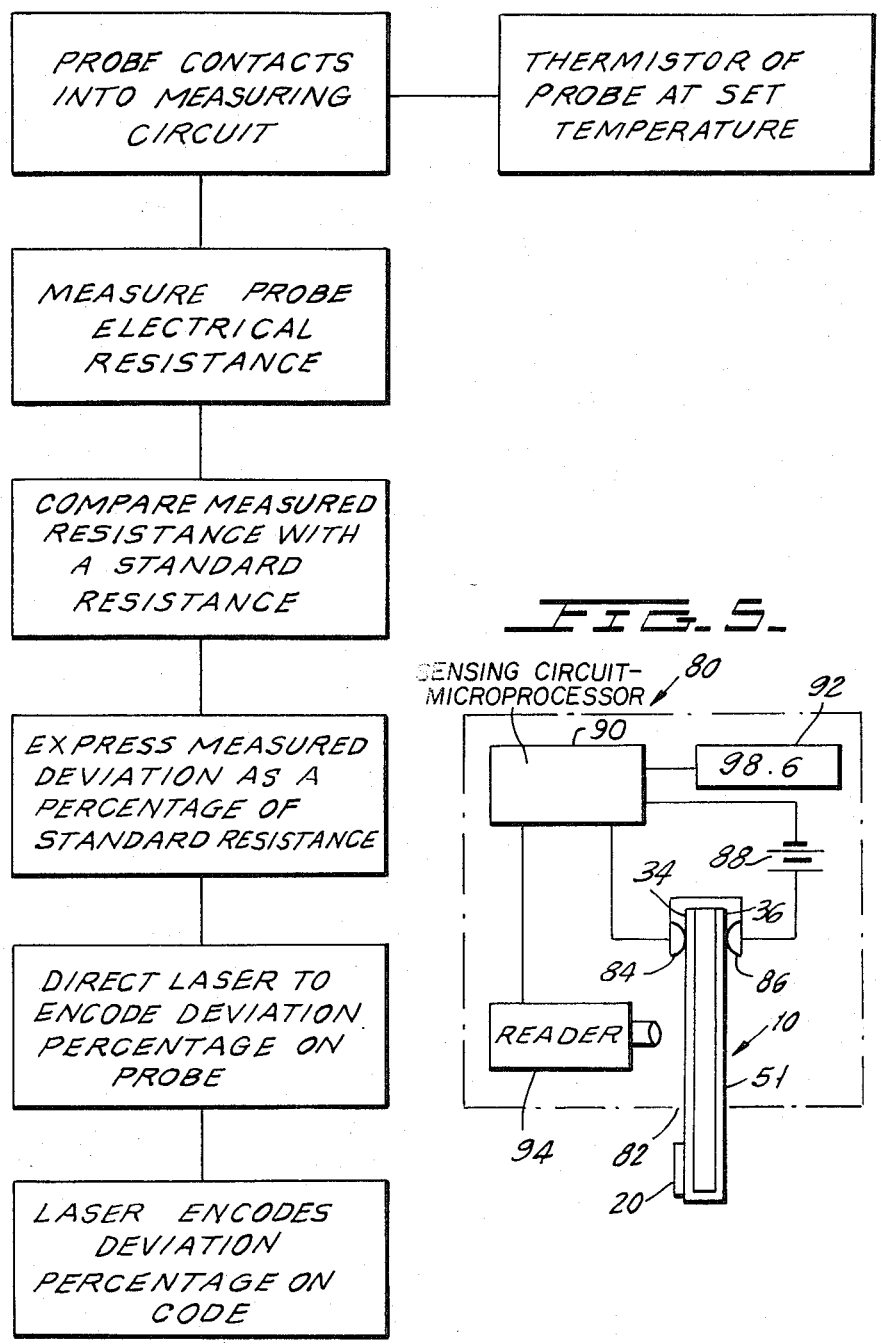

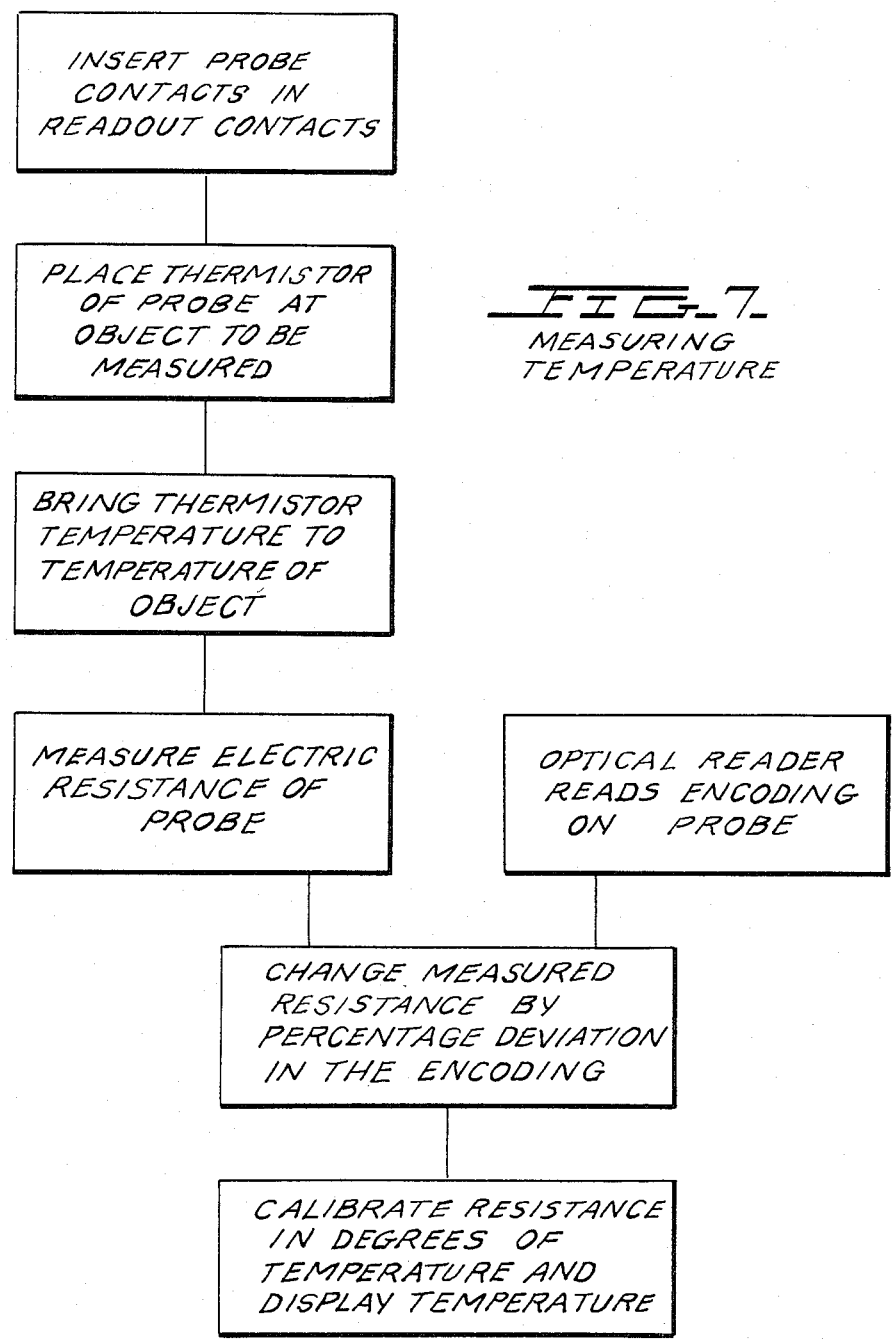

DISPOSABLE THERMOMETER PROBE AND RATING TECHNIQUE THEREFOR

BACKGROUND OF THE INVENTION

The present invention relates to a disposable, accurately rated thermometer probe and particularly relates to a simple method for accurately temperature-rating a thermometer probe for use in a temperature readout.

Various disposable thermometers have been developed. Disposability eliminates the cost of sterilizing thermometers for reuse. Disposable thermometers must be inexpensively and rapidly produced. Yet, they must be sufficiently accurate to satisfy recognized clinical standards, e.g. for readings of human body temperature, they must be accurate to within 2/10ths of a degree Fahrenheit over the range of human temperatures, i.e. around 98.6° F. or 37° C.

The inventor hereof has previously devised a thermometer system comprised of disposable thermometer probes and of a readout into which a probe is plugged for providing a temperature. See U.S. Pat. No. 4,317,367. The disposable probe utilizes a temperature-sensing element whose electrical properties vary proportionately with the temperature of the sensing element, and one temperature variable electric property of the sensing element is converted by the readout into a temperature reading.

In one preferred probe, a thermistor, which is a ceramic element with a negative temperature coefficient of resistance, serves as the sensing element. The thermistor is mounted on a supporting substrate, is sheathed in a thin, heat-transmitting sheath and is connected in circuit with conductors that extend along the length of the substrate. The substrate and the conductors thereon are plugged into a readout which senses the resistance of the circuit including the thermistor and converts the sensed resistance into an indication of the temperature of the thermistor.

During its manufacture, each thermometer probe is temperature rated against a standard. In the present inventor's previous method, the temperature-sensing element of the probe is adjusted, so that every probe will produce the same temperature indication in the readout when the sensing elements of the probes are all at the same temperature.

The inventor's previous method of rating thermistor probes is described in U.S. Pat. Nos. 4,200,970 and 4,236,298. An assembled thermometer probe is connected in circuit with apparatus that measures electric resistance, the resistance of the probe circuit is measured, and part of one of the contacts on the thermistor is removed to adjust the resistance of the probe to a predetermined value. Although the prior method is effective, the steps involved can cause that method to be somewhat more expensive than the method disclosed herein. In particular, in the prior method, the probe to be rated is first measured for its resistance. To then adjust its resistance, a portion of a contact of the thermistor is trimmed away. The probe resistance is again measured and, if further adjustment is needed, further contact trimming is performed, until the resistance of the probe is brought within an acceptable range of the desired resistance, corresponding to an acceptable deviation from precise temperature probe accuracy. Each separate trimming and resistance-measuring step require some time. Also, whatever thermistor contact trimming technique is used, the thermistor is shocked by impact, pressure and/or vibration and by the rapid temperature rise which the thermistor experiences during trimming. Too severe a temperature shock could permanently alter the thermistor's characteristics. In any event, thermistor contact trimming will at least for a short time, raise the temperature of the thermistor, and the rating of the respective probe cannot again be checked until the heated thermistor returns to its previous temperature level. Finally, all temperature probes used in the prior method must have slightly lower resistances than the desired resistance, since trimming away part of a thermistor contact will always raise the resistance toward the desired level. If too much thermistor contact material is removed during the adjustment process or the thermistor initially has too little contact material, the probe will have too high resistance, and it must be discarded, since there is no practical technique for again reducing the resistance to the desired level. Hence, frequent probe discards are created due to the manner in which the thermistor probes are rated. Since unusuable probes have to be discarded subsequent to their assembly, there is wasted effort and materials used in fabricating such probes.

Another well known rating techique is providing matched pairs of thermistors, comprising selecting, from a large supply of thermistors, two thermistor pieces which together have the desired resistivity. This uses double the number of thermistor pieces and time is wasted in searching for matched pieces.

SUMMARY OF THE INVENTION

Accordingly, the primary object of the present invention is to easily rate a thermometer probe for accurate temperature sensing in conjunction with a readout.

It is another object of the present invention to rate such a thermometer probe using a thermistor as the temperature-sensing element.

Still another object of the invention is to rate such a probe with only a single temperature measurement and a single rating step, instead of a plurality of repeated steps.

It is yet another object of the invention to avoid time consuming rating or matching steps and to reduce the quantity of prepared thermistor pieces required for a thermometer probe.

A further object of the invention is to rate such a thermometer probe, wherein it is not necessary to discard probes which have a resistance slightly greater than the electrical resistance corresponding to a properly rated thermometer probe.

It is yet another object of the invention to provide a combination of a readout and a thermometer probe for providing an accurate, inexpensive disposable thermometer system.

In a process according to the present invention, a small size thermistor is mounted on a substrate and the thermistor is connected to a pair of conductors running along the substrate. The resulting individual thermistor-type temperature-sensing probe has a target electric resistance at a standard clinical temperature, e.g. 6,000 ohms at 37° C. The individual probe substrates may be supplied on a continuous card, or in a continuous roll of substrates, or in a radiating or "daisy wheel" array. The particular array of substrates would not affect this invention. Each individual thermistor-type sensing probe, or a large array of them, are inserted into an appropriate handling apparatus for holding the probe or probes and for connecting the conductors of each probe in an electric circuit whereby the resistance of the probe may be sensed. The thermistor of each probe is held at a predetermined temperature, such as 37° C., for example by being immersed in a liquid bath at that temperature. An internal bridge circuit in a computer, that is electrically connected to each of the thermistor probes in turn, measures the resistance of each thermistor probe individually. Typically, all of the thermistor probes are near to but not at the target resistance. The comparison bridge in the computer reads the actual resistance of each probe as a deviation percentage from the final target resistance of 6,000 ohms, for example. Encoding means, for example an encoding laser, is provided in the handling apparatus. The computer directs the encoding means laser to encode scribed characters, and primarily machine readable characters, indicating the aforesaid deviation percentage of a particular probe onto the electric contact of at least one of the conductors or onto the substrate of that probe at the end of that probe which will be inserted into the readout. A character may be applied by means other than a laser. For example, a mechanically or optically sensed character may be inscribed or embossed on the substrate; a magnetically encodable strip applied to the substrate may have the character magnetically applied to it for being read by a magnetic readout; a character readable by a charge coupled device is applied to the substrate to be read by a charge coupled reader device, etc.

At the time of use of each probe, it, and all others in its common array, if there is one, is inserted into a readout that includes electric contacts which connect the thermistor probe into an electric circuit with a resistance meter that is calibrated to express the sensed resistance in terms of the temperature of the thermistor of the probe. The readout additionally contains an appropriate character reader which reads the previously encoded information character located on the inserted end of the probe. The reader includes its own computer which receives a signal generated by the reader and adds or subtracts the encoded percentage deviation value from the actual resistance that is measured, and this is passed onto the linearized microprocessor in the readout. This may be done either by selecting a resistance from a resistance network chip, which is secondary to the main circuit, or it may be done without resort to such a resistance network, by directly passing the information encoded on the probe to the microprocessor as an additional resistance to be added to or subtracted from the resistance that is already present in the thermistor probe in order to achieve the target resistance. The readout has been adjusted so that if the thermistor of that probe were subjected to the standard temperature at which the probe was rated, the readout would measure the target resistance. With this adjustment, the readout correctly indicates the temperature of the thermistor, which is the temperature to which the medium being sensed has heated or cooled the thermistor.

The foregoing and other objects and features of the invention will become apparent from the following description of preferred embodiments of the invention considered in conjunction with the accompanying drawings in which:

BRIEF DESCRIPTION OF THE DRAWINGS

FIG. 1 is a perspective view of a thermometer probe used in conjunction with the present invention;

FIG. 2 is a side view thereof;

FIG. 3 is a fragmentary view thereof, showing encoded characters according to the invention;

FIG. 4 schematically illustrates apparatus for measuring a probe and for encoding information;

FIG. 5 is a schematic view of a readout for indicating the temperature measured by the probe;

FIG. 6 is a flow diagram for encoding; and

FIG. 7 is a flow diagram for temperature sensing.

DESCRIPTION OF THE PREFERRED EMBODIMENT

The present invention is used in conjunction with a thermometer probe, such as that disclosed in U.S. Pat. No. 4,317,367. Referring to FIGS. 1 and 2, the thermometer probe comprises a flexible, thin, elongate, plastic substrate 12. Thin, foil-like metal conductor layers 14 and 16 are applied on and extend along the opposite elongate surfaces of the substrate. The conductor 16 wraps around the end 18 of the substrate to extend on the same side as and next to but separated from the conductor 14 for a short distance near the substrate end 18. The conductors 14, 16 are offset from each other between the sides of the substrate so that the conductors 14, 16 will be spaced apart near end 18. At the end 18 of the substrate, a thermistor 20 is positioned atop the conductors 14 and 16. The thermistor has electric contact material coated on the opposite surfaces thereof in the manner described in U.S. Pat. No. 4,200,970, for example. There are two contact material pads 22, 24 arranged side by side on the underside of the thermistor 20 and these are separated by a gap 25 which extends longitudinally of the substrate. The conductor 14 contacts the first contact pad 22 at the underside of the thermistor 20. The conductor 16 contacts the separate contact pad 24 that is gap separated from the pad 22 also on the underside of the thermistor 20. The contact pads 22 and 24 are mechanically and electrically affixed and connected to the conductors 14 and 16 by an appropriate solder which can be applied at a temperature low enough so as not to shock the thermistor.

A sheath of liquid and air impermeable, yet thin and heat transmitting, light weight plastic material 28 encloses the tip of the probe, the thermistor 20 and the conductors, at least in the vicinity of the thermistor. Since thermometer probes are placed inside a patient's body and in wet areas, this sheath prevents short-circuiting of the probe.

The conductors 14, 16 extend to the other end 32 of the substrate, where the conductors terminate at 34, 36 in contact elements which are adapted to be plugged into a readout, as described further below.

As shown in FIG. 3, the contact 34 in the vicinity of but spaced from the end 32 of the substrate is provided with encoded, machine readable characters 51 which are representative of the resistance rating of this thermistor probe which cooperates with a particular readout, as described below. The manner in which the rating characters are applied to the conductor in the first instance, the nature of the characters applied and the cooperation between the characters and the readout are discussed below.

FIGS. 4 and 6 illustrate an apparatus 50 and a method for producing encoding 51 to each probe 10. The encoding apparatus 50 includes a housing with an insertion and probe guide opening 54 into which the probe 10 is inserted, end 32 first. The probe is inserted between the opposing electric contacts 56, 58 which are so placed and are of a width as to contact the respective contacts 34, 36 at the ends of the conductors 14, 16. The contacts 56, 58 are in an electric circuit with a power supply 62, which applies a potential to the probe circuit including the thermistor 20. The circuit also includes the thermistor circuit potential measuring and encoding laser operating computer 64. The encoding laser 66 is instructed by the computer to apply indicia to the conductor 16 beneath the substrate 12.

A thermometer probe 10 with a thermistor, having the characteristics described above, with the thermistor at a standard clinical temperature of 37° C. or 98.6° F., which is normal human body temperature, has an ideal or target resistance, of 6,000 ohms, for example. All of the thermistors 20 that have been previously formed for all of the probes 10 have been diced to a size so that each thermometer probe circuit, including the thermistor 20 and the conductors 14, 16, will, when the thermistor is at 37° C., have a resistance of about 6,000 ohms. Since great precision in dicing thermistors and forming circuits is not possible, all of the thermistor probe circuits start with a resistance somewhere in the range between 5,700 ohms and 6,000 ohms, with the thermistor at 37° C. After the probe has been inserted into the encoding apparatus 50, as described above, and with the thermistor 20 held at 37° C., for example by dipping the thermistor 20 in the bath 67 which is held at 37° C. in the container 68, the internal comparison bridge circuit in the laser computer 64 reads the actual resistance of the probe 10 as a deviation percentage from the target resistance of 6,000 ohms. The computer 64 directs the laser 66 to encode this percentge deviation from 6,000 ohms on the contact 36 on conductor 16 at the end of the probe, because this probe end will also be inserted into the readout. Encoded, machine-readable character 51 is a unique character which represents this percentage deviation. For example, the laser 66 might be activated to burn a bar code 51 into the contact 36 or a dot matrix code, or even human readable characters, so long as the encoding is machine-readable by the readout. Furthermore, it may be desirable to burn the same code into the contacts 34 and 36 at both sides of the probe, so that the probe may be inserted into the readout with either contact 34 or 36 facing up without the user having to be concerned about this. The encoding means may be other than a laser 66, as would be apparent to one skilled in the art. Alternate encoding techniques have been noted above.

A benefit of thus encoding a probe 10 is that the encoding is done at a location on the probe remote from the thermistor 20, whereby the thermistor is not shocked by abrasion, laser trimming or application of heat or mechanical stress, as other rating techniques require.

Clearly, this rating method can be performed automatically on a series array of probes, avoiding the need for manual handling of individual probes during the rating. In one proposed form of the invention, a series of probes are arranged side by side and are initially separably secured together with all of the thermistors extending from one side edge of the series array. For example, a card carrying twenty-four individual thermistor probes with the thermistors arrayed along one side and the contacts along the opposite side of the card are inserted into an appropriate probe handler near the computer, so that all of the thermistors of the twenty-four probes are immersed in the 37° C. bath. The internal bridge circuit in the laser-operating computer sequentially measures each thermistor individually and operates the laser to encode each thermistor probe in turn with respective characters representative of the deviation percentage between the actual measured resistance and the target resistance.

In an alternate technique for rating a thermometer probe, both a thermometer probe to be rated and a previously rated standard thermistor probe, which is rated at 6,000 ohms at 37° C., are positioned in a medium, such as a liquid bath or even an air flow, at the standard temperature of 37° C., so that both the thermistor of the standard probe and the thermistor of the probe being rated are maintained at 37° C. Both thermistor probe circuits are connected to a comparator, which includes conventional circuit means which determines the percentage differential, whether above or below, of the actual sensed resistance of the test probe from the target resistance of 6,000 ohms of the standard probe. As in the previously described method, the comparator activates a laser to encode characters representative of the percentage differential between the sensed resistance and the target resistance, for subsequent adjustment of the readout.

Referring to FIGS. 5 and 7, subsequent to rating of the thermistor probes, and when it is desired to use a thermistor probe for sensing a temperature, an individual probe 10 is separated from a card or a continuous supply or a series of probes and is connected with a readout 80 which is adapted to the probe 10 and its encoded resistance rating. The readout 80 includes the entry slot 82 for the contact bearing end of the probe 10. In the reader 80 are the electric contacts 84, 86 for respectively contacting the contacts 34 and 36 of the probe 10. Through the power supply 88, the contacts 84, 86 are in circuit with an electric circuit 90 which includes a linearized microprocessor that in conventional manner converts the electric resistance of the circuit including the contacts 84, 86 and the probe 10 into a visible indicator to be read at the indicator 92, e.g. an LED or LCD display.

As noted above, however, each probe 10 has its own resistance and the percentage differential between that resistance and a target resistance has been encoded on the probe. In order for an accurate temperature to be stated at the indicator 92, therefore, the resistance in the circuit 90 must be adjusted for the rating of that probe 10 then being used. Accordingly, an optical reader 94, adapted and positioned to sense the encoding on the probe 10, is aimed at the probe 10 where the encoding 51 appears on the contact 36 or on the substrate itself, or on any other plug, or even on wires leading to the plug. The optical reader reads the encoded information and generates a signal based upon it. The reader includes its own computer which adds or subtracts the generated signal representing the encoded percentage deviation value from the actual resistance of the probe that is measured and this corrected value is passed onto the linearized microprocessor in the readout. This may be done either by selecting a resistance from a resistance network chip, which is secondary to the main circuit, or it may be done without resort to such a resistance network, by directly passing the information encoded on the probe to the microprocessor as an additional resistance to be added to or subtracted from the resistance that is already present in the thermistor probe in order to achieve the target resistance. The readout has been adjusted so that if the thermistor of that probe were subjected to the standard temperature at which the probe was rated, the readout would measure the target resistance. With this adjustment, the readout correctly indicates the temperature of the thermistor, which is the temperature to which the medium or object being sensed has heated or cooled the thermistor. The indicator 92 receives a resistance signal, but it is calibrated to express this in terms of degrees of temperature of the thermistor 20. In this manner, the temperature of the medium, object or person being measured is accurately indicated.

One example of a probe rated according to the above-described method is now provided. A probe placed in the encoding apparatus 50 is read by the computer 64 as having a resistance of 5,760 ohms with the thermistor at 37° C. Since the target resistance is 6,000 ohms, the computer causes the laser 66 to encode upon the contact 34 at the end of the probe a machine-readable pattern character 51 translatable by an optical character reader and its associated circuit as +4%, which is the percentage deviation between 5,760 and 6,000 ohms. The circuit 90 in the readout then simply translates this +4% difference into the 240 ohm change in resistance in the circuit in the readout necessary to bring the previously mentioned 5,760 ohms to 6,000 ohms. The readout thus has been adjusted so that it would indicate the target resistance if the thermistor 20 were at the standard temperature at which the probe was rated. What the readout 80 now indicates when the probe 10 is inserted therein is the temperature based upon a resistance which has been provided to the readout by the thermistor probe circuit, as modified by the encoded differential at the inserted end of the probe. Instances may also develop where the resistance measured by the computer 64 is above 6,000 ohms. The encoding provided on the thermistor probe conductor would, in this case, be a minus percentage number, indicating the decrease in ohms that is needed, and the circuit in the readout would have to be arranged so as to read a value of 6,000 ohms at 37° C. by subtracting voltage in order to arrive at an accurate reading.

One preferred embodiment, wherein the character is encoded using a laser has been described. As is apparent from the description herein, various other encoding techniques using a variety of different characters may be employed. For example, a character comprising score marks, which is encoded by the laser 66, could be scanned and read by a charge-coupled device. However, any other characters capable of being read by a charge-coupled device may be provided on the probe. The encoding laser encodes the information about each probe digitally on the probe, and the readout uses a charge-coupled scanner to scan the digitally-encoded information and convert the same to an appropriate printout or presents the same on a screen or on the readout. One significant benefit of a charge-coupled device is that it can electronically scan the encoded characters for an entire series of thermistor probes, without the characters themselves and/or the scanner having to be relatively moved. Instead, the scanner extends across all of the characters on all of the probes, and the scanner is electrically activated to scan each probe in sequence.

Without having to manipulate, alter, remove material from or otherwise change any characteristics of the thermistor 20 of the probe 10 during temperature probe rating or during temperature sensing and readout, the variations of individual probes 10 are easily adjusted for and accurate temperature readings will be able to be taken with all of the probes. A simple, simply rated temperature probe can be easily made and used according to the invention.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A method of rating a thermometer probe for being readable in a readout apparatus, wherein the probe comprises a temperature-sensing element which has an electrical characteristic that changes responsive to the temperature of the sensing element, and electric conductors electrically connected in circuit with the sensing element, the method comprising:
subjecting the sensing element predetermined to a particular temperature, until the sensing element attains the particular temperature;
measuring the electrical resistance of the probe with the sensing element at the particular temperature;
comparing the measured electrical resistance of the probe with a standard electrical resistance; and
encoding the difference between the measured resistance and the standard resistance onto the probe for enabling later readout of the encoding.

2. The method of claim 1, wherein the encoding comprises encoding machine-readable characters onto the probe.

3. The method of claim 2, wherein the sensing element is a thermistor.

4. The method of claim 2, wherein the encoding comprises using a laser to scribe the probe with machine-readable characters.

5. A method for sensing the temperature of something, comprising:
providing a thermometer probe comprising a temperature-sensing element which has an electrical characteristic that changes responsive to the temperature of the sensing element, and the probe further comprising electric conductors electrically connected in circuit with the sensing element;
rating the thermometer probe by:
subjecting the sensing element to a predetermined particular temperature, until the sensing element attains the particular temperature;
measuring the electrical resistance of the probe with the sensing element at the particular temperature;
comparing the measured electrical resistance of the probe with a standard electrical resistance; and
encoding the difference between the measured resistance and the standard resistance onto the probe in machine readable characters for enabling later readout of the encoding, whereby the probe is rated;
the sensing of the temperature of the thing comprising:
applying the temperature-sensing element of the thermometer probe that has been rated to the thing the temperature of which is to be sensed for causing the sensing element to attain the temperature of that thing;
measuring actual resistance of the thermometer probe in a readout apparatus which provides an indication of temperature responsive to the resistance measured in the readout apparatus;

sensing the machine-readable characters encoded on the thermometer probe and converting those characters into a signal representing the deviation of the resistance of that probe from the standard resistance;

adjusting the measured actual resistance in the readout apparatus for the signal representing the deviation of the resistance of that thermometer probe from the standard resistance, so that the readout apparatus would measure the standard resistance if the sensing element of the probe were at the predetermined particular temperature at which the encoding occurred; and providing a temperature indication at the readout, corresponding to the adjusted resistance of the probe corresponding to the temperature of the thing.

6. The method of claim 5, wherein the indication of adjusted resistance of the probe is calibrated in terms of the predetermined particular temperature of the sensing element.

7. The method of claim 5, wherein the sensing element is a thermistor.

8. The method of claim 5, wherein the encoding comprises using a laser to scribe the probe with machine-readable characters.

9. A method of sensing the temperature of something, comprising:

forming a thermometer probe, wherein the probe comprises a temperature-sensing element which has an electrical characteristic that changes responsive to the temperature of the sensing element, and the probe further comprises electric conductors electrically connected in circuit with the sensing element, said probe forming further comprising applying said conductors to electrical contacts of the sensing element;

rating the thermometer probe by:

subjecting the sensing element to a predetermined particular temperature, until the sensing element attains the particular temperature;

measuring the electrical resistance of the probe with the sensing element at the particular temperature;

comparing the measured electrical resistance of the probe with a standard electrical resistance; and encoding the difference between the measured resistance and the standard resistance onto the probe in machine readable characters for enabling later readout of the encoding, whereby the probe is rated;

the sensing of the temperature of the thing comprising:

applying the temperature-sensing element of the thermometer probe that has been rated to the thing the temperature of which is to be sensed for causing the sensing element to attain the temperature of that thing;

measuring actual resistance of the thermometer probe in a readout apparatus which provides an indication of temperature responsive to the resistance measured in the readout apparatus;

sensing the machine-readable characters encoded on the thermometer probe and converting those characters into a signal representing the deviation of the resistance of that probe from the standard resistance;

adjusting the measured resistance in the readout apparatus for the signal representing the deviation of the resistance of that thermometer probe from the standard resistance, so that the readout apparatus would measure the standard resistance if the sensing element of the probe were at the particular temperature at which the encoding occurred; and providing a temperature indication at the readout, corresponding to the adjusted resistance of the probe corresponding to the temperature of the thing.

10. The method of claim 9, further comprising applying the conductors on a supporting substrate and seating the sensing element on the substrate.

11. The method of claim 10, wherein the sensing element is a thermistor.

12. The method of claim 5, wherein the encoding is performed on the probe at a location spaced away from the sensing element.

13. Apparatus for rating a thermometer probe for being readable in a readout, wherein the thermometer probe comprises a temperature-sensing element which has an electrical characteristic that changes responsive to the temperature of the sensing element and comprises electric conductors electrically connected in circuit with the sensing element, the apparatus for rating comprising:

means for causing the sensing element to attain a predetermined particular temperature; means for measuring the electrical resistance of the probe at the conductors of the probe, while the sensing element is at the particular temperature;

computer means for comparing the measured resistance of the probe with a standard resistance;

encoding means for encoding information on the probe, and the computer means being connected with the encoding means for causing the encoding means to encode information representing the difference between the measured resistance and the standard resistance.

14. The apparatus of claim 13, wherein the sensing element is a thermistor.

15. The apparatus of claim 13, wherein the encoding means comprises a laser for scribing the probe with the machine-readable characters, and the computer means being connected with the laser for causing it to scribe the characters.

16. The apparatus of claim 13, wherein the encoding means is for encoding information in the form of a machine-readable character on the probe and the computer means is connected with the encoding means for causing encoding of a machine-readable character representing the difference between the measured resistance and the standard resistance.

17. Apparatus for measuring the temperature of something, comprising:

a thermometer probe comprising a temperature-sensing element which has an electrical characteristic that changes responsive to the temperature of the sensing element and comprises electric conductors electrically connected in circuit with the sensing element;

apparatus for rating the thermometer probe comprising:

means for causing the sensing element to attain a predetermined particular temperature; means for measuring the electrical resistance of the probe at the conductors of the probe, while the sensing element is at the particular temperature;

computer means for comparing the measured resistance of the probe with a standard resistance;

encoding means for encoding information on the probe in the form of a machine readable character, and the computer means being connected with the encoding means for causing the encoding means to encode the information representing the difference between the measured resistance and the standard resistance;

a separate readout apparatus for measuring actual resistance of the previously rated thermometer probe and for indicating a temperature corresponding to a measured resistance;

the readout apparatus including electric contacts for respectively contacting the conductors of the probe, and comprising a measuring circuit connected with the readout contacts for measuring actual resistance of the thermometer probe;

a character reader for reading the encoded character on the probe, and the reader being connected with the measuring circuit for adjusting the measured resistance of the thermometer probe in the measuring circuit to compensate for the difference in the resistance of that probe from the standard resistance, so that the measuring circuit would measure the standard resistance, if the sensing element of the probe were at the particular temperature; and indicating means for providing an indication of the temperature corresponding to the adjusted measured resistance of the thermometer probe corresponding to the temperature of the thing.

18. The apparatus of claim 17, wherein the sensing element is a thermistor.

19. The apparatus of claim 17, wherein the encoding means comprises a laser for scribing the probe with machine-readable characters, and the computer means being connected with the laser for causing it to scribe the characters.

20. The apparatus of claim 17, wherein the indicating means is adapted to provide an indication of the sensed resistance calibrated in terms of the temperature of the sensing element.

* * * * *